(12) United States Patent
Kersten

(10) Patent No.: US 6,250,857 B1
(45) Date of Patent: Jun. 26, 2001

(54) DRILL

(75) Inventor: Heinrich Kersten, Verden (DE)

(73) Assignee: Gebrüder Heller Drinklage GmbH, Drinklage (DE)

( * ) Notice: Subject to any disclaimer, the term of this patent is extended or adjusted under 35 U.S.C. 154(b) by 0 days.

(21) Appl. No.: 09/395,430

(22) Filed: Sep. 14, 1999

(30) Foreign Application Priority Data

Sep. 14, 1998 (DE) ............................................. 198 41 978

(51) Int. Cl.⁷ .................................................... B23B 51/02
(52) U.S. Cl. .......................... 408/230; 175/394; 408/227; 408/400
(58) Field of Search .................................. 408/223, 224, 408/227, 229, 230; 175/394, 395, 398, 400, 415

(56) References Cited

U.S. PATENT DOCUMENTS

| | | | |
|---|---|---|---|
| 329,174 | * | 10/1885 | Johnson ................................ 408/230 |
| 542,223 | * | 7/1895 | Johnson ................................ 408/230 |
| 893,162 | * | 7/1908 | Hackett ................................ 408/230 |
| 4,579,180 | * | 4/1986 | Peetz et al. ........................... 175/394 |
| 4,913,603 | * | 4/1990 | Friedli et al. ......................... 408/230 |
| 5,078,554 | * | 1/1992 | Kubota ................................. 408/230 |
| 5,160,232 | * | 11/1992 | Maier ................................... 408/230 |

FOREIGN PATENT DOCUMENTS

2184373 * 6/1987 (GB) .................................... 408/230

* cited by examiner

Primary Examiner—A. L. Wellington
(74) Attorney, Agent, or Firm—Schiff Hardin & Waite

(57) ABSTRACT

A drill having a drill head with a drill shank extending between the drill head and a plug-in end lying opposite the drill head, said drill shank having a conveying helix formed by at least two helical flutes and webs located between the flutes. The flutes comprise the same clear cross section at least in the region of the end of the drill shank adjacent the drill head and are arranged at an angle a in a range of 130° through 170° relative to one another.

17 Claims, 2 Drawing Sheets

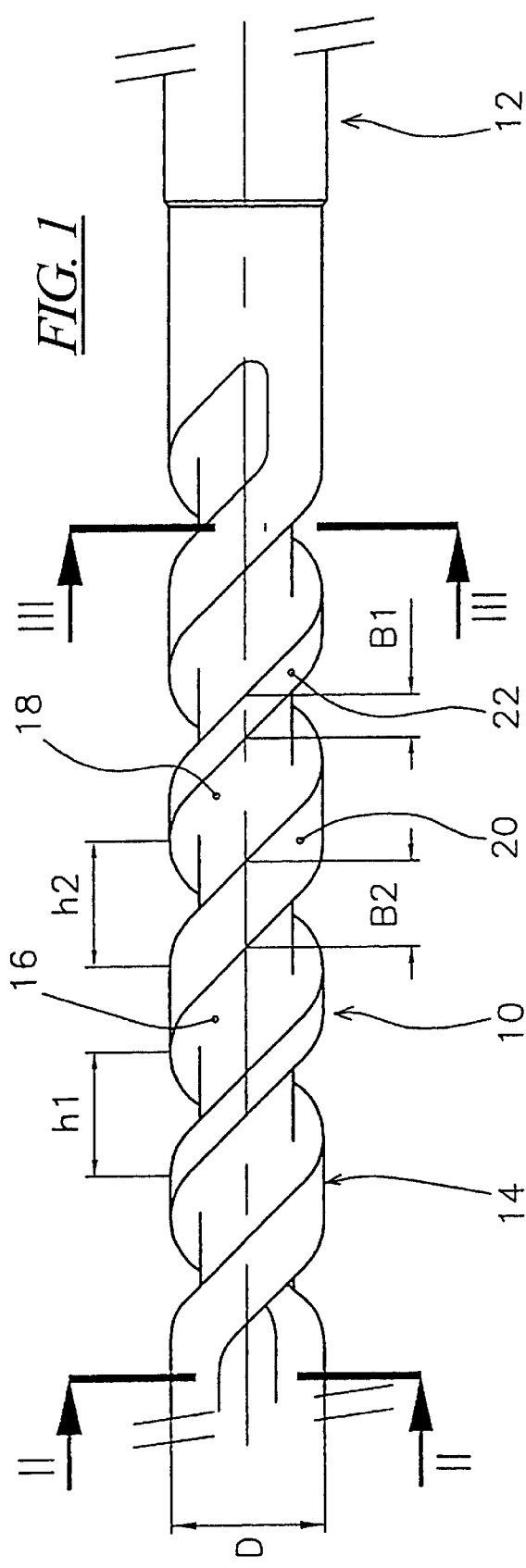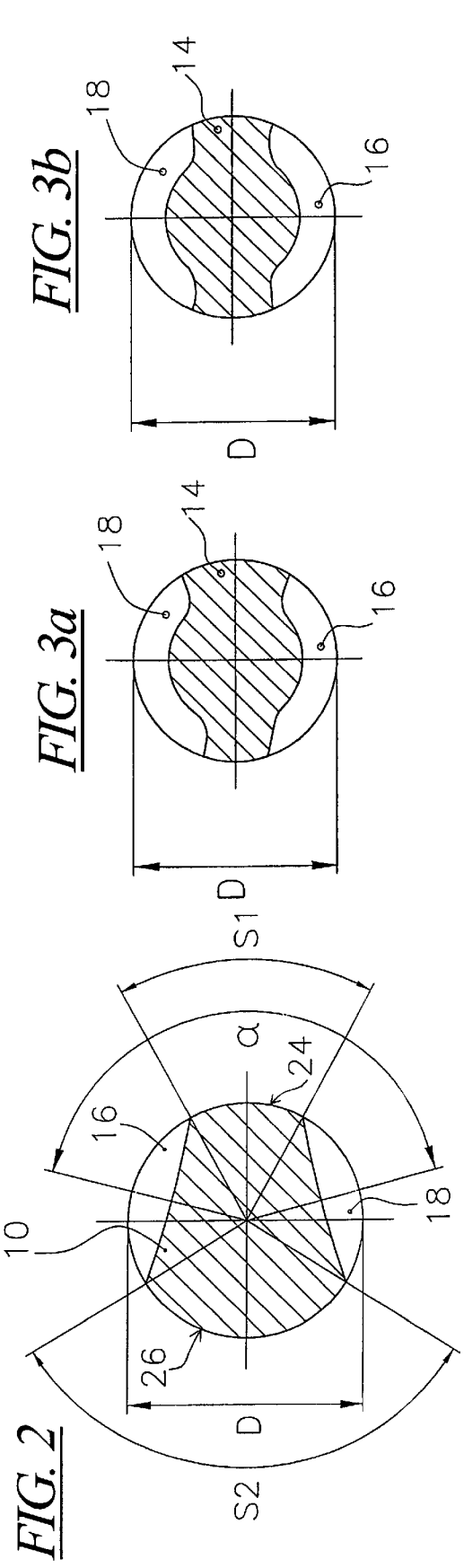

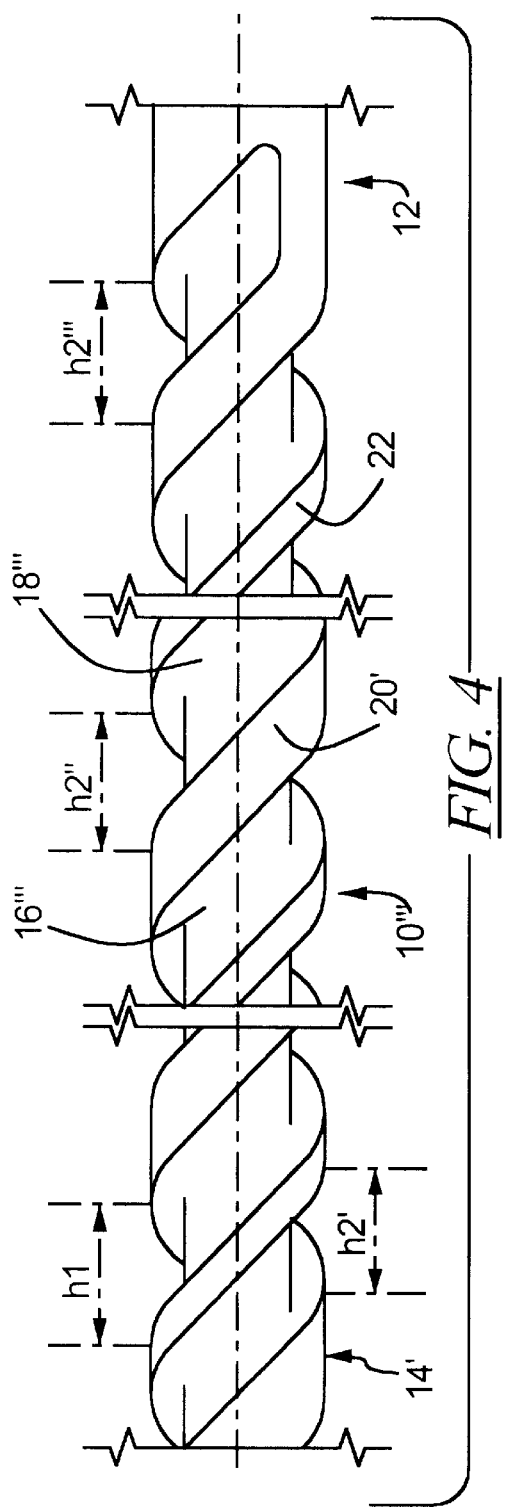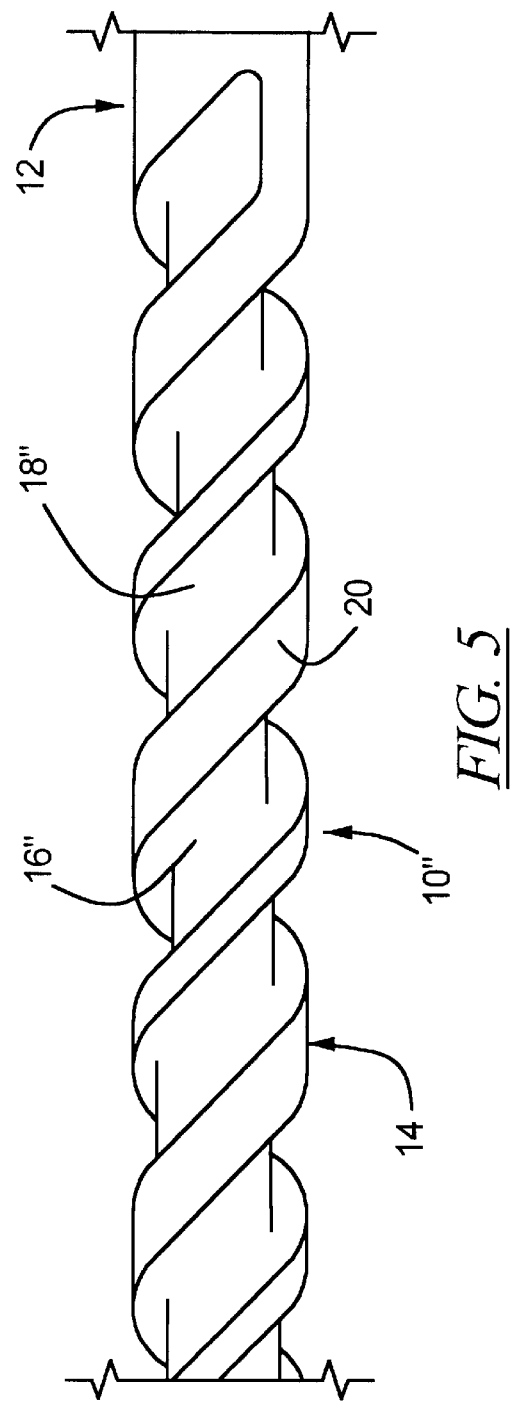

DRILL

BACKGROUND OF THE INVENTION

The present invention is directed to a drill, which can be a multi-purpose drill used for drilling masonry as well as a drill for drilling wood or metal.

The greatest significance is accorded to a spiral or twist drill among drill tools, since it is considered the most important tool when producing cylindrical holes from a solid or for enlarging a predetermined hole diameter during a drilling operation. Its share of metal-cutting fabrication is estimated between 20% and 25%, and it is currently the metal-cutting tool that is produced in the greatest piece numbers and is most wide-spread. Viewed in simple fashion, a spiral drill is composed of a drill head, a drill shank that comprises a conveying helix and a plug-in end. What is referred to as a "double-thread" conveying helix is formed by two flutes or grooves arranged offset by 180°. The two-thread conveying helices fashioned in this way can buckle during drilling and lead to unstable drilling behavior.

SUMMARY OF THE INVENTION

The present invention is based on the object of offering a drill having a higher stability in the region of the conveying helix.

This object is inventively achieved by a drill having a drill head, a drill shank which comprises a conveying helix formed by at least two helical flutes and webs located between the flutes, and having a plug-in end lying opposite the drill head. The two flutes exhibit the same clear cross section at least in the end of the drill shank facing toward the drill head and arc arranged at an angle α in the range of 130° to 170° relative to one another so that the flutes are not diametrically opposite one another.

It can thereby be provided that the relationship between the width B1 of the back face of the first web in a longitudinal direction of the conveying helix amounts to a 1:2 relationship to the width B2 of the back face of the second web in the longitudinal direction of the conveying helix.

In particular, it can thereby be provided that the first web merges into a back face at the end of the drill shank facing toward the drill head, and the back face interacts with the wall of the drill hole and extends over a distance S1=B1 in a circumferential direction of the drill, and the second web merges into a back face at the end of the drill shank facing toward the drill head that interacts with the drill hole wall and over a distance S2=B2 in a circumferential direction of the drill.

According to another particular embodiment of the invention, it can be provided that the slope h1 of the first flute corresponds to the slope h2 of the second flute. As a result thereof, the angle α remains constant over the entire length of the conveying helix.

On the other hand, it can also be provided that the slope h1 of the first flute differs from the slope h2 of the second flute and the widths of the flutes can, thus, be varied.

It can also be provided that at least one of the slopes h1, h2 of the first and second flutes varies over the length of the conveying helix. The widths of the flutes can, thus, likewise vary.

Finally, it can be provided that the depth of at least one flute varies over the length of the conveying helix. A variation in the flute depth leads to a variation of the core of the drill shank. This leads to a greater flute transport cross section compared to conveying helices having the same outside diameter, this reducing and precluding the problem of blockage occurring, specifically given smaller drill dimensions with high drilling advance. The widths of the flutes can also be varied.

The invention is based on the surprising perception that webs having back faces of different size due to an asymmetrical arrangement of the flutes, i.e., not lying diametrically opposite one another, the conveying helix and, thus, the overall system is lent a higher buckling strength. As has been shown on the basis of a load analysis of the multi-axis stress and impact energy transport condition at prototypes, the inventive drills have, in detail, the following advantages compared to drills known from the prior art having flutes with the same transport cross section. These advantages are:

1. Higher stability with higher buckling strength given parameters that are otherwise the same;
2. Better impact energy transport with higher dynamic buckling strength under load of the pulses acting thereon given parameters that are otherwise the same; and
3. More advantageous vibration behavior given parameters that are otherwise the same.

Other advantages and features of the invention will be readily apparent from the following description of the preferred embodiments, the drawings and claims.

BRIEF DESCRIPTION OF THE DRAWINGS

FIG. 1 is a side view of a specific embodiment of a drill shank which extends between a drill head and plug-in end which have been omitted for the sake of clarity;

FIG. 2 is a cross sectional view taken along the line II—II in FIG. 1;

FIG. 3a is a cross sectional view taken along the line III—III of FIG. 1;

FIG. 3b is a cross sectional view through a drill in the prior art corresponding to that of FIG. 3a;

FIG. 4 is a side view of a section of a drill having one flute having a changed slope related to the other flute of a fixed slope; and FIG. 5 is a side view of a drill having a flute with a varying depth.

DESCRIPTION OF THE PREFERRED EMBODIMENTS

FIG. 1 shows a side view of a specific embodiment of the inventive drill shank, which extends between a drill head (not shown) and the plug-in end. In addition to the drill head, which is not shown and which would be located at the left-hand side of the illustration, the drill comprises a drill shank 10 and a plug-in end 12 that is partially indicated. The drill shank 10 comprises a two-thread conveying helix 14 having a diameter D that is formed by first and second flutes or grooves 16 and 18 as well as a first web 22 and a second web 20, which are located between the flutes 16 and 18. The second web 20 comprises a width B2 and the first web 22 has a width B1, wherein the widths B1 and B2 are measured in a longitudinal direction of the conveying helix 14 and have a relationship B2=2×B1 being valid for that ratio of the widths B1 to B2. The flute or groove 16 has a slope h1 and the second flute or groove 18 has a slope h2. The relationship of the slopes h1 and h2 is h1=h2.

As can be seen from the illustration in FIG. 2, the first and second flutes 16 and 18 comprise identically clear cross sections in the region of the end of the drill shank 10, which is adjacent the drill head, and are arranged at an angle α between the radial bisector of the flutes, which is 150° relative to one another. At the end of the drill shank 10 adjacent the drill head, the first web 22 also merges into a back face 24 interacting with the wall of the drill hole that extends over a distance S1=B1 in a circumferential direction of the drill. The second web 20, at an end of the drill shank 10 adjacent the drill head, merges into a back face 26 interacting with the wall of the drill hole that extends over a distance S2=B2 in a circumferential direction. Thus, the back face 24 is smaller than the back face 26.

FIG. 3*a* shows a cross sectional view along the line III—III of FIG. 1, and FIG. 3*b* shows a cross sectional view of a drill of the prior art corresponding to that of FIG. 3*a*. While the drill of the prior art has a drill shank 14' having a two-thread conveying helix, wherein the first and second flutes 16' and 18' are arranged diametrically opposite one another, the first and second flutes 16' and 18' are also arranged unchanged diametrically opposite one another, as shown in FIG. 3*b*. In the same location of FIG. 1, the first and second flutes 16 and 18 in the specific embodiment of the inventive drill continue to be arranged at an angle of 150° relative to one another in FIG. 3*a*. Taking into consideration that the double cross section is spatially twisted, a higher moment of resistance is assured given the inventive drill in a rotational direction and, thus, a higher buckling strength is assured, which contributes to the stabilization of the overall drill.

In FIG. 5, a drill 10" has a flute 16" and a flute 18". The flute 16" has a constant depth and the flute 18" has a changed depth which gets deeper as the distance from the plug-in end decreases.

In FIG. 4, a drill 10''' has a flute 16''' of a constant slope h1. The flute 18''' has a changing slope of h2'<h2"<h2''' and these slopes are less than h1.

Both individually as well as in arbitrary combinations, the features of the invention disclosed in the above specification and the drawings as well as in the claims can be critical for realizing the various embodiments of the invention.

I claim:

1. A drill comprising a drill head, a drill shank, said drill shank having a conveying helix formed by at least two helical flutes and webs located between the flutes and having a plug-in end lying opposite the drill head, said two flutes comprising the same clear cross section at least in the region of the end of the drill shank adjacent the drill head and the flutes being arranged at an angle a in a range of 130° through 170° relative to one another.

2. A drill according to claim 1, wherein the ratio between a width B1 of the back face of a first web in the longitudinal direction of the conveying helix to the a width B2 of the back face of a second web in the longitudinal direction of the conveying helix amounts to 1:2.

3. A drill according to claim 2, wherein, at the end of the drill shank adjacent the drill head, the first web merges into a back face interacting with the wall of the drill hole that extends over a distance S1=B1 in the circumferential direction of the drill and, at the end of the drill shank adjacent the drill head, the second web merges into a back face interacting with the wall of the drill hole that extends over a distance S2=B2 in a circumferential direction of the drill.

4. A drill according to claim 3, wherein a slope h1 of the first flute is the same as a slope h2 of the second flute.

5. A drill according to claim 4, wherein the depth of at least one flute varies along the length of the conveying helix.

6. A drill according to claim 3, wherein the slope h1 of the first flute differs from the slope h2 of the second flute.

7. A drill according to claim 3, wherein at least one of the slopes h1 and h2 of the first and second flutes varies over the length of the conveying helix.

8. A drill according to claim 3, wherein the depth of at least one flute varies over the length of the conveying helix.

9. A drill according to claim 2, wherein a slope h1 of the first flute is the same as a slope h2 of the second flute.

10. A drill according to claim 9, wherein the depth of at least one flute varies over the length of the conveying helix.

11. A drill according to claim 2, wherein a slope h1 of the first flute differs from a slope h2 of the second flute.

12. A drill according to claim 2, wherein at least one of a slope h1 of the first flute and a slope h2 of the second flute varies over the length of the conveying helix.

13. A drill according to claim 1, wherein a slope h1 of the first flute is the same as a slope h2 of the second flute.

14. A drill according to claim 13, wherein the depth of at least one flute varies over the length of the conveying helix.

15. A drill according to claim 1, wherein a slope h1 of the first flute differs from a slope h2 of the second flute.

16. A drill according to claim 1, wherein at least one of a slope h1 of the first flute and a slope h2 of the second flute varies over the length of the conveying helix.

17. A drill according to claim 1, wherein the depth of at least one flute varies over the length of the conveying helix.

* * * * *